United States Patent
Wang et al.

(10) Patent No.: US 11,133,680 B2
(45) Date of Patent: Sep. 28, 2021

(54) BALANCING SYSTEM FOR RECHARGEABLE ENERGY STORAGE ASSEMBLY WITH MULTIPLE PARALLEL UNITS

(71) Applicant: GM Global Technology Operations LLC, Detroit, MI (US)

(72) Inventors: Yue-Yun Wang, Troy, MI (US); Lei Hao, Troy, MI (US); Suresh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 195 days.

(21) Appl. No.: 16/242,637

(22) Filed: Jan. 8, 2019

(65) Prior Publication Data
US 2020/0220364 A1  Jul. 9, 2020

(51) Int. Cl.
| | |
|---|---|
| *H02J 7/00* | (2006.01) |
| *B60L 58/13* | (2019.01) |
| *B60L 58/15* | (2019.01) |
| *B60L 58/14* | (2019.01) |
| *B60L 50/64* | (2019.01) |

(52) U.S. Cl.
CPC ............ *H02J 7/0014* (2013.01); *B60L 50/64* (2019.02); *B60L 58/13* (2019.02); *B60L 58/14* (2019.02); *B60L 58/15* (2019.02)

(58) Field of Classification Search
CPC ......... B60L 58/15; H02J 7/0021; H02J 7/045; H02J 2007/0067; H02J 7/0048; H02J 7/0031; B60W 2510/244

USPC ................................. 320/132, 126, 134, 136
See application file for complete search history.

(56) References Cited

U.S. PATENT DOCUMENTS

| | | | |
|---|---|---|---|
| 2007/0188134 A1* | 8/2007 | Hussain | H01M 10/44 320/114 |
| 2012/0086400 A1* | 4/2012 | White | H02J 7/0016 320/118 |
| 2016/0013521 A1* | 1/2016 | Matsunaga | H02J 7/0069 320/134 |
| 2017/0047747 A1* | 2/2017 | Kufner | H02J 7/0019 |
| 2019/0073012 A1* | 3/2019 | Sultenfuss | H02J 7/007 |
| 2020/0244075 A1* | 7/2020 | Park | H02J 7/0048 |

\* cited by examiner

*Primary Examiner* — Nathaniel R Pelton
*Assistant Examiner* — Mohammed J Sharief
(74) *Attorney, Agent, or Firm* — Quinn IP Law

(57) ABSTRACT

System and method of dynamically balancing a rechargeable energy storage assembly having two or more respective units, a respective switch for each of the respective units and at least one sensor. The system includes a controller configured to control operation of the respective switch. The respective switch is configured to enable a respective circuit connection to the respective units when in an ON state and disable the respective circuit connection when in an OFF state. The respective units are characterized by a respective state of charge obtained based in part on the at least one sensor. A controller is configured to selectively employ at least one of a plurality of charging modes to charge one or more of the respective units, through operation of the respective switch. The plurality of charging modes includes a rest charging mode, a rapid initial charging mode and a rapid final charging mode.

18 Claims, 4 Drawing Sheets

BALANCING SYSTEM FOR RECHARGEABLE ENERGY STORAGE ASSEMBLY WITH MULTIPLE PARALLEL UNITS

INTRODUCTION

The present disclosure relates to a system and method of dynamically balancing the state of charge of a rechargeable energy storage assembly having at least two units connected in parallel. The use of purely electric vehicles and hybrid vehicles, such as battery electric vehicles, window extended electric vehicles, hybrid electric vehicles, plug-in hybrid electric vehicles and fuel cell hybrid electric vehicles, has greatly increased over the last few years. The source of propulsion for hybrid electric vehicles, purely electric vehicles and other electric-powered transportation devices may be a rechargeable energy storage unit having multiple units.

SUMMARY

Disclosed herein are a system and method of dynamically balancing a rechargeable energy storage assembly having at least two respective units connected in parallel, a respective switch for each of the respective units and at least one sensor. The system includes a controller configured to control operation of the respective switch. The respective switch is configured to enable a respective circuit connection to the respective units when in an ON state and disable the respective circuit connection when in an OFF state. The respective units are characterized by a respective state of charge obtained based in part on the sensor. The controller has a processor and tangible, non-transitory memory on which is recorded instructions.

Execution of the instructions by the processor causes the controller to employ at least one of a plurality of charging modes through operation of the respective switch to charge the respective units. The plurality of charging modes includes a rest charging mode, a rapid initial charging mode and a rapid final charging mode. The plurality of charging modes is configured to reduce internal power dissipation by reducing differences of state of charge amongst the respective units. The rest charging mode is configured to selectively employ a first constant charging current and the rapid initial charging mode is configured to selectively employ a second constant charging current. The second constant charging current is greater than the first constant charging current. The rapid final charging mode is configured to selectively employ a constant voltage.

The respective units include a first unit and a second unit, with the controller being configured to determine a first state of charge ($SOC_1$) for the first unit and a second state of charge ($SOC_2$) for the second unit. In the rest charging mode, the controller may be configured to turn the respective switch of the first unit and the respective switch of the second unit to the ON state and charge with the first constant charging current until the first unit and the second unit are fully charged when an absolute value of a difference between the first state of charge ($SOC_1$) and the second state of charge ($SOC_2$) is less than a first predefined constant ($C_1$). The controller may be configured to turn the respective switch associated with a higher value of the respective state of charge to the OFF state and selectively charge the respective unit associated with a lower value of the respective state of charge when the difference between the first state of charge ($SOC_1$) and the second state of charge ($SOC_2$) is more than the first predefined constant ($C_1$).

In the rapid initial charging mode, where there are exactly two respective units, the controller may be configured to turn the respective switch of the first unit and the respective switch of the second unit to the ON state and charge with the second constant charging current when a first state of charge ($SOC_1$) for the first unit and a second state of charge ($SOC_2$) for the second unit are both less than a first threshold ($T_1$). The controller may be configured to set a target state of charge and selectively charge the respective unit associated with a lower value of the state of charge until charged to the target state of charge when an absolute value of a difference between the first state of charge ($SOC_1$) and the second state of charge ($SOC_2$) is greater than a second predefined constant ($C_2$). In one example, the first threshold ($T_1$) is 50%.

In the rapid final charging mode, the controller may be configured to turn the respective switch of each of the respective units to the ON state and charge with a constant voltage, when the respective state of charge of at least one of the respective units is less than a second threshold ($T_2$). The controller may be configured to turn to the OFF state the respective switch associated with the at least one of the respective units and selectively charge remaining ones of the respective units, when the respective state of charge of at least one of the respective units is greater than a maximum energy value ($E_{max}$). The second threshold ($T_2$) may be within 5% of a magnitude of the maximum energy value ($E_{max}$).

In the rapid initial charging mode, where there are more than two respective units, the controller may be configured to set a target state of charge at a third threshold ($T_3$), turn the respective switch of each of the respective units to the ON state and charge with a second constant charging current. The controller may be configured to apply an integration control scheme to a specific one of the respective units and selectively charge until fully charged when an absolute value of a difference between the respective state of charge ($SOC_i$) of the specific one of the respective units and the third threshold ($T_3$) is less than a third predefined constant ($C_3$). In one example, the third threshold ($T_3$) is between 50% and 70%, inclusive, and the third predefined constant ($C_3$) is between 5% and 7%, inclusive.

The integration control scheme includes selecting a target state of charge as a maximum of the respective state of charge of the respective units, and defining a disparity factor as a difference between a target state of charge and the respective state of charge of the specific one of the respective units. The integration control scheme includes shifting an applied voltage to the specific one of the respective units from a negative value to a positive value when the disparity factor is above a disparity threshold, the disparity threshold being less than zero.

The system may include a discharging mode during which the controller is configured to keep the respective switch of the first unit and the respective switch of the second unit in the ON state and discharge the first unit and the second unit, when a load demand current ($I_d$) is more than or equal to a rated current limit ($I_{L1}$) of the first unit. In the discharging mode, when the load demand current ($I_d$) is less than the rated current limit ($I_{L1}$) of the first unit and the first unit has a higher state of charge relative to the second unit, the controller may be configured to (1) turn the respective switch of the first unit to the ON state, turn the respective switch of the second unit to the OFF state and discharge the first unit; (2) set the target state of charge as the respective state of charge of the second unit and apply an integration control scheme to the respective switch of the first unit; and (3) turn the respective switch of the first unit and the respective switch of the second unit to the ON state and discharge the first unit and the second unit, when an absolute value of a difference between the respective state of charge of the first unit and the respective state of charge of the second unit is less than a fourth predefined constant ($C_4$).

The above features and advantages and other features and advantages of the present disclosure are readily apparent from the following detailed description of the best modes for carrying out the disclosure when taken in connection with the accompanying drawings.

DETAILED DESCRIPTION

Figure 1:
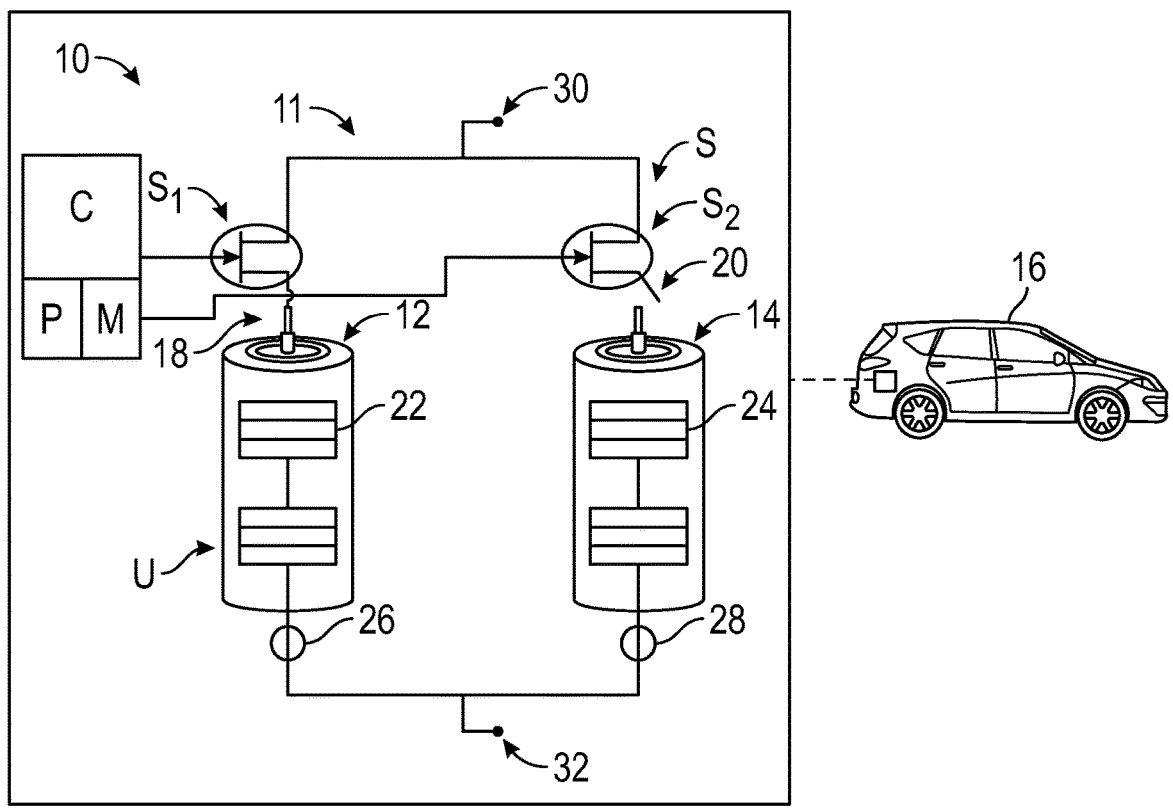
FIG. 1 is a schematic diagram of a system of balancing a rechargeable energy storage assembly including at least two respective units, the system having a controller.

Referring to the drawings, wherein like reference numbers refer to like components, FIG. 1 schematically illustrates a system 10 for dynamically balancing a rechargeable energy storage assembly 11 having two or more respective units U connected in parallel, such as first unit 12 and second unit 14. Referring to FIG. 1, the rechargeable energy storage assembly 11 may be part of a device 16. The device 16 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or other transportation device. The device 16 may take many different forms and include multiple and/or alternate components and facilities.

The rechargeable energy storage assembly 11 may include rechargeable units having different chemistries, including but not limited to, lithium-ion, lithium-iron, nickel metal hydride and lead acid batteries. Referring to FIG. 1, the first unit 12 and second unit 14 may include a respective plurality of cells 22, 24, which may further include one or more sub-cells. It is understood that the number of respective units U, cells and sub-cells may be varied based on the application at hand.

Referring to FIG. 1, a controller C is in communication with the rechargeable energy storage assembly 11. The controller C includes at least one processor P and at least one memory M (or non-transitory, tangible computer readable storage medium) on which are recorded instructions for executing at least one method or mode. The memory M can store controller-executable instruction sets, and the processor P can execute the controller-executable instruction sets stored in the memory M.

The controller C is configured to employ at least one of a plurality of charging modes to charge the respective units U. The plurality of charging modes includes a rest charging mode 100, a rapid initial charging mode 200, an alternate rapid initial charging mode 300 and a rapid final charging mode 400, respectively described below with reference to FIGS. 2, 3, 4, and 5. The controller C may be configured to execute a discharge mode 500, described in FIG. 6. Referring to FIG. 1, the first end 30 and the second end 32 of the rechargeable energy storage assembly 11 may be connected to a source or sink (not shown) available to those skilled in the art for charging or discharging, respectively.

Each of the respective units U is operatively connected with a respective switch S having an ON state and an OFF state. The respective switch S is configured to enable a respective circuit connection when in an ON state and disable the respective circuit connection when in an OFF state. Referring to FIG. 1, a first switch $S_1$ is in communication with the first unit 12, via a respective circuit connection 18 (shown in an ON state). A second switch $S_2$ is in communication with the second unit 14, via the respective circuit connection 20 (shown in an OFF state).

Operation of the respective switches S is controlled by the controller C. As described below, the respective switches S and control logic are used to selectively cut-off high or low energy ones of the respective units U to balance the assembly 11 based on the level of state of charge differences among the respective units U and charge/discharge load demands. The respective switches S may be composed of semi-conductors. In one example, the respective switches S are silicon MOSFET switches. Other switches available to those skilled in the art may be employed.

The respective units U are characterized by a respective state of charge obtained based in part on at least one sensor, such as for example, a first sensor 26 and a second sensor 28 shown in FIG. 1. The state of charge refers to the stored charge available to do work relative to that which is available after the respective unit U has been fully charged. The state of charge may be viewed as an assessment of the potential energy of the respective unit U, extending between a minimum of 0% and a maximum of 100%. The first sensor 26 may be configured to communicate the voltage of the first unit 12 to the controller C. The second sensor 28 may be configured to provide voltage for the second unit 14. The state of charge and its derivative factors impact efficiency and power availability of the device 16 and may be employed for the purpose of regulating operation of the device 16.

The rest charging mode 100, rapid initial charging mode 200, alternate rapid initial charging mode 300, rapid final charging mode 400 and discharge mode 500 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The rest charging mode 100, rapid initial charging mode 200, alternate rapid initial charging mode 300, and rapid final charging mode 400 may be concurrently executed by the controller C or may be selected by a user or operator of the rechargeable energy storage assembly 11.

Figure 2:
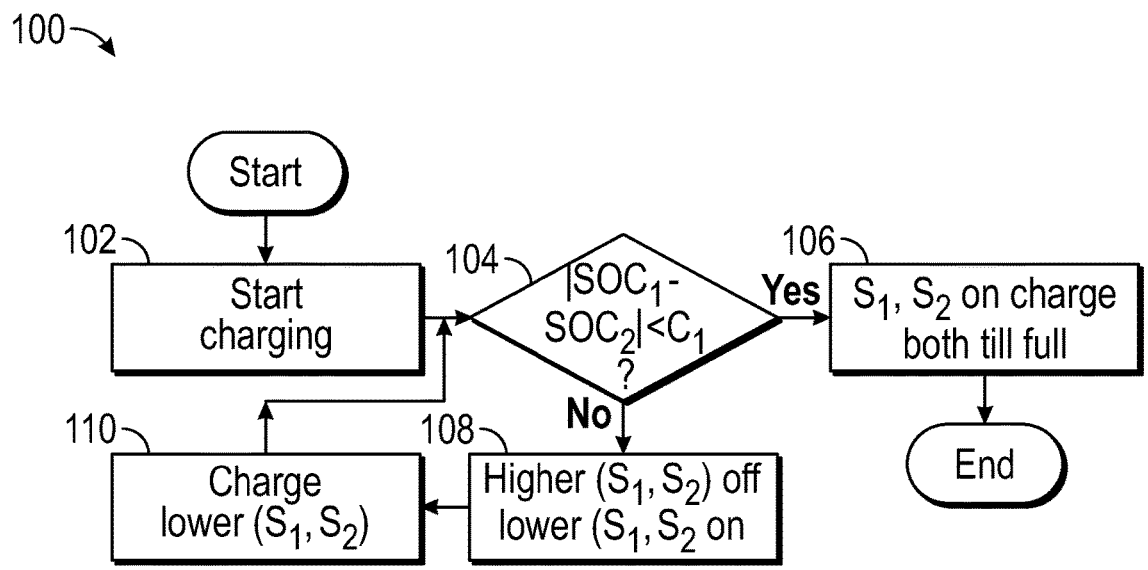
FIG. 2 is a schematic flow diagram of a rest charging mode executable by the controller of FIG. 1.

Referring now to FIG. 2, a flowchart of the rest charging mode 100 stored on and executable by the controller C of FIG. 1 is shown. Per block 102, the controller C is programmed to begin charging the first unit 12, the second unit 14 and determine a first state of charge ($SOC_1$) for the first unit 12 and a second state of charge ($SOC_2$) for the second unit 14. The first and second state of charge $SOC_1$, $SOC_2$ may be estimated based on the data from at least the first sensor 26, the second sensor 28 and various mathematical models available to those skilled in the art.

Per block 104 of FIG. 2, the controller C is configured to determine if an absolute value of a difference between the first state of charge ($SOC_1$) of the first unit 12 and the second state of charge ($SOC_2$) of the second unit 14 is less than a first predefined constant ($C_1$). If so, the rest charging mode 100 proceeds to block 106, where the controller C is programmed to turn the first switch $S_1$ and the second switch $S_2$ both to the ON state and charge the first unit 12 and the second unit 14 with a first constant charging current until both are fully charged.

If not, the rest charging mode 100 proceeds from block 104 to block 108, where the controller C is programmed to turn the respective switch S associated with a higher value of the respective state of charge to the OFF state and selectively charge (per block 110) the respective unit U associated with a lower value of the respective state of charge. Thus, if the first unit 12 has a higher value of the respective state of charge, the first switch $S_1$ is turned to the OFF state and the second unit 14 is charged. The rest charging mode 100 loops back to block 104.

Figure 7A:
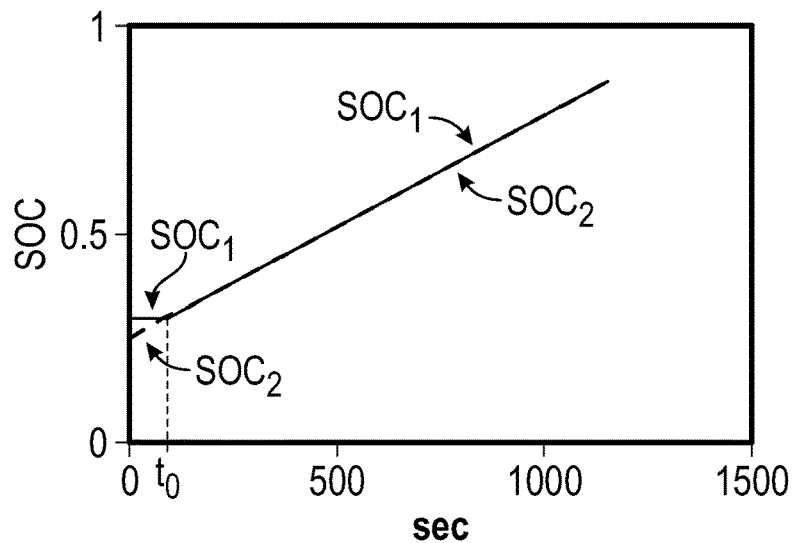
FIG. 7A is a schematic example graph showing a first state of charge ($SOC_1$) and a second state of charge ($SOC_2$) over time for a first unit and a second unit in the rechargeable energy storage assembly of FIG. 1.
Figure 7B:
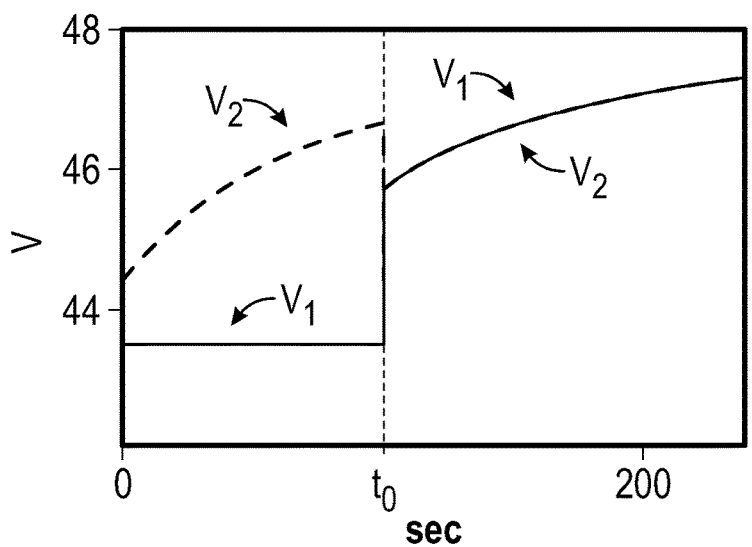
FIG. 7B is a schematic example graph showing an applied voltage (V) over time for the first and second units of FIG. 7A, with an enlarged time scale.

The rest charging mode 100 is further illustrated with respect to FIGS. 7A and 7B. Referring to FIG. 7A, a schematic example is shown of the first state of charge ($SOC_1$) and the second state of charge ($SOC_2$) of the first and second units 12, 14. In this example, the first predefined constant ($C_1$) is 1%. Referring to FIG. 7A, at time zero, the difference between the first state of charge ($SOC_1$) and the second state of charge ($SOC_2$) is greater than the first predefined constant ($C_1$). Thus, the controller C (moving from block 104 to block 108 of FIG. 2) is programmed to turn the first switch $S_1$ to the OFF state (since the first state of charge ($SOC_1$) is greater) and selectively charge (per block 110) the second unit 14. FIG. 7B shows the corresponding voltage showing an applied voltage (V) over time for the first unit 12 and the second unit 14 of FIG. 7A. The portion prior to time to is the single charge portion ($V_1<V_2$) and the portion after time $t_0$ is the parallel charge portion ($V_1=V_2$). Note that the scale of time is enlarged in FIG. 7B relative to FIG. 7A. At time $t_0$, the first state of charge ($SOC_1$) and the second state of charge ($SOC_2$) are approximately equal, or within 1% (magnitude of the first predefined constant ($C_1$) in this example). The controller C loops back from block 110 to block 104 and then block 106 of FIG. 2, keeping both the first switch $S_1$ and the second switch $S_2$ in the ON state and charging the first and second units 12, 14 until fully charged.

Figure 3:
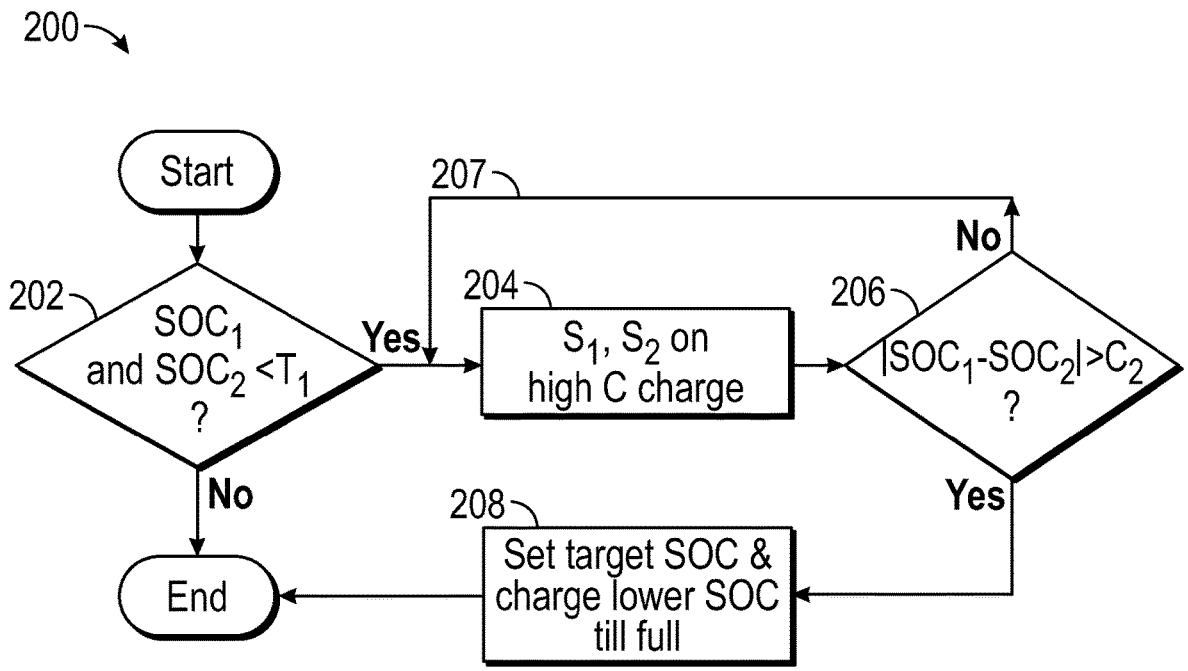
FIG. 3 is a schematic flow diagram of a rapid initial charging mode executable by the controller of FIG. 1.

Referring now to FIG. 3, a flowchart of the rapid initial charging mode 200 is shown, applicable for a system 10 having exactly two respective units U. Per block 202, the controller C is programmed to determine if both the first state of charge ($SOC_1$) for the first unit 12 and a second state of charge ($SOC_2$) for the second unit are less than a first threshold ($T_1$). If so, then per block 204, the controller C is configured to turn the respective switch of the first unit 12 and the respective switch of the second unit 14 to the ON state and charge with a second constant charging current, the second constant charging current being higher than the first constant charging current. If not, the rapid initial charging mode 200 is exited. The magnitude of the first and second constant charging current may vary based on the size and particulars of the respective units. In one example, the second constant charging current is between 10% and 40% greater than the first charging current. In another example, the second constant charging current is about 30% greater than the first charging current.

Proceeding to block 206 from block 204, the controller C is configured to determine if an absolute value of a difference between the first state of charge ($SOC_1$) and the second state of charge ($SOC_2$) is greater than a second predefined constant ($C_2$). When this is the case, per block 208, the controller C is configured to set a target state of charge and selectively charge the respective unit U associated with a lower value of the state of charge until charged to the target state of charge. When this is not the case, the rapid initial charging mode 200 loops back (as indicated by line 207) to block 204. In one example, the first threshold ($T_1$) is selected to be 50%.

Figure 4:
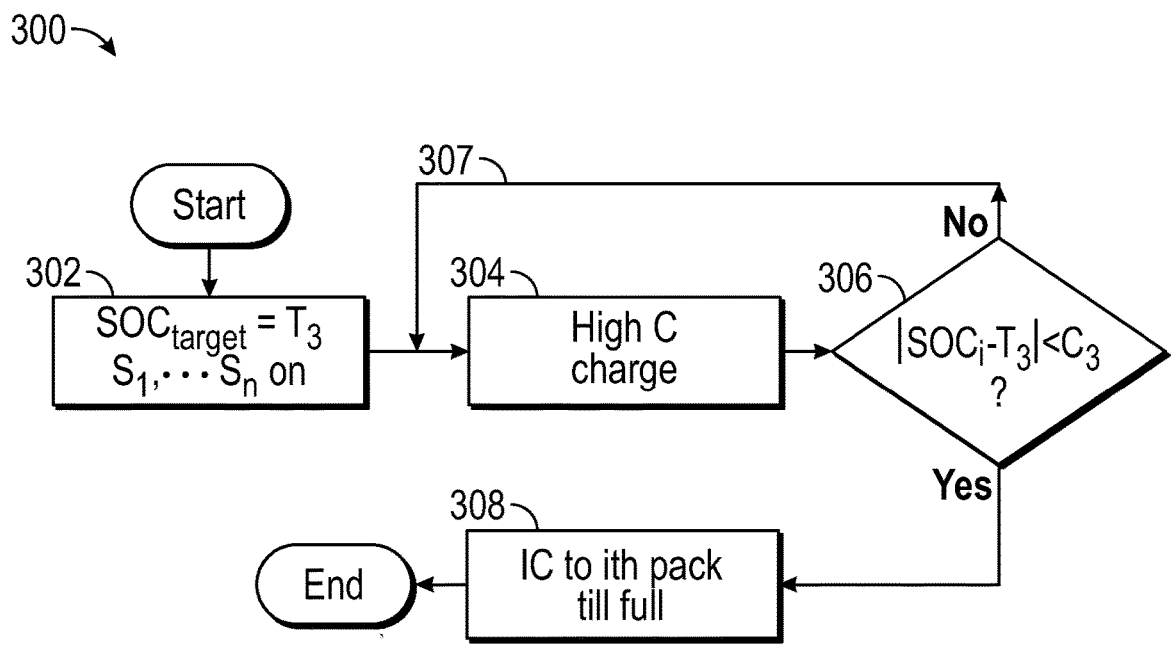
FIG. 4 is a schematic flow diagram of an alternate rapid initial charging mode executable by the controller of FIG. 1.

Referring to FIG. 4, a flowchart of an alternative rapid initial charging mode 300 is shown, applicable for a system 10 where there are more than two respective units U. Per block 302, the controller C is programmed to set a target state of charge at a third threshold ($T_3$) and turn the respective switch of each of the respective units U to the ON state. Per block 304, the controller C is configured to charge the respective units U with a second constant charging current, the second constant charging current being higher than the first constant charging current. In block 306 of FIG. 4, the controller C is configured to determine if an absolute value of a difference between the respective state of charge ($SOC_i$) of a specific one of the respective units and the third threshold ($T_3$) is less than a third predefined constant ($C_3$). When this is the case, the alternative rapid initial charging mode 300 proceeds to block 308 where the controller C is configured to apply an integration control scheme to the specific one of the respective units and selectively charge until fully charged. If not, the alternative rapid initial charging mode 300 loops back to block 304, as indicated by line 307. In one example, the third threshold ($T_3$) is between 50% and 70%, inclusive, and the third predefined constant ($C_3$) is between 5% and 7%, inclusive.

Figure 7C:
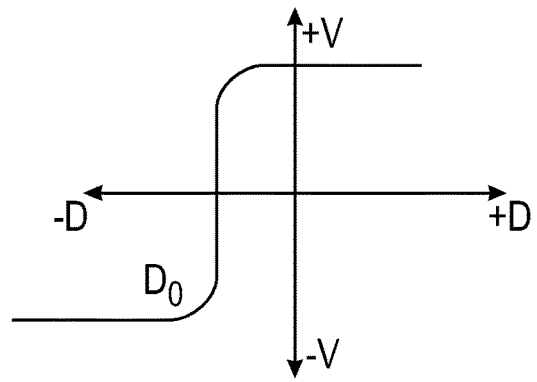
FIG. 7C is a schematic example graph showing an applied voltage (V) over a disparity factor (D) for an integration control scheme executable by the controller of FIG. 1.

Referring to FIG. 7C, a schematic example graph is shown of an applied voltage (extending between +V and −V) over a disparity factor (extending between +D and −D). The disparity factor D is defined as a difference between a target state of charge and the respective state of charge of a specific one of the respective units U. The integration control scheme includes selecting a target state of charge as a maximum of the respective state of charge of the respective units U. In other words, whatever is the maximum value of the state of charge of the group of respective units U is selected as the target state of charge. The integration control scheme includes shifting the voltage applied to the respective unit U from a negative value to a positive value (see FIG. 7C) when the disparity factor (D) is above a disparity threshold ($D_0$), such that the disparity threshold ($D_0$) is less than zero.

Figure 5:
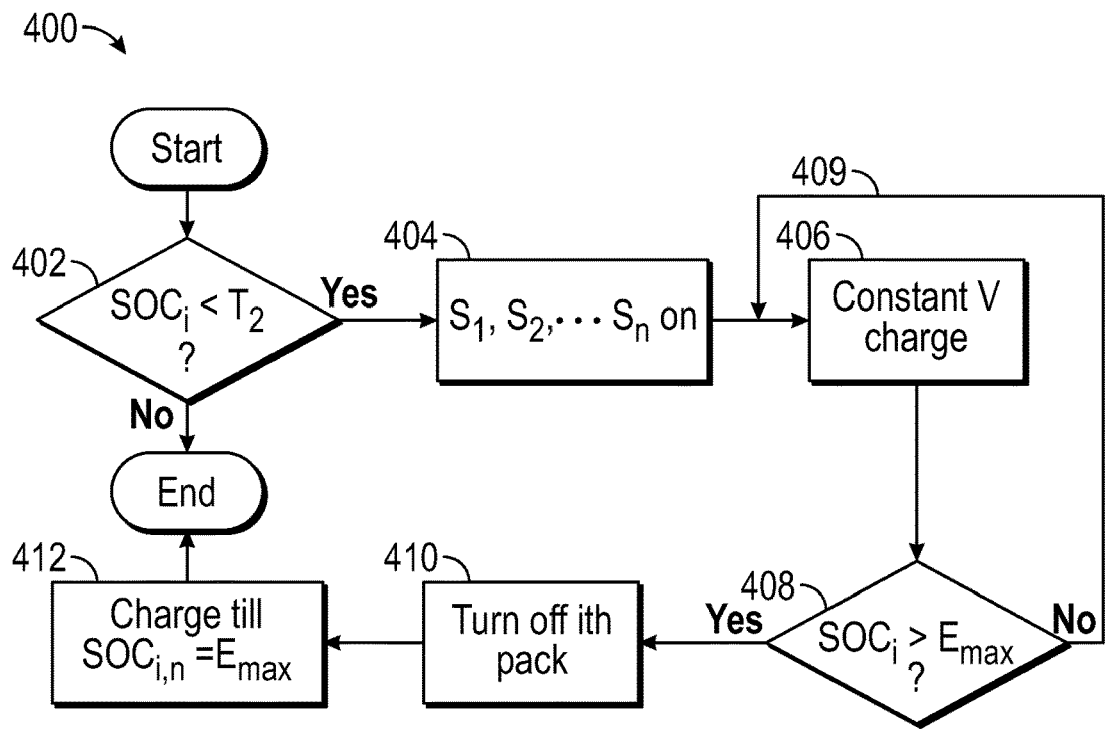
FIG. 5 is a schematic flow diagram of a rapid final charging mode executable by the controller of FIG. 1.

Referring to FIG. 5, a flowchart of the rapid final charging mode 400 is shown. Per block 402, the controller C is programmed to determine if the respective state of charge of at least one ($SOC_i$) of the respective units U is less than a second threshold ($T_2$). When this is the case, per block 404, the controller C is configured to turn the respective switch of each of the respective units U to the ON state and charge with a constant voltage (see block 406). Per block 408, the controller C is configured to determine if the respective state of charge of at least one (for example, the ith unit) of the respective units U is greater than a maximum energy value ($E_{max}$). If not, the rapid final charging mode 400 loops back from block 408 to block 406, as indicated by line 409. If so, per block 410, the controller C is configured to turn to the OFF state the respective switch associated with the at least one (ith unit) of the respective units U and per block 412, selectively charge remaining ones of the respective units U. In one example, the second threshold ($T_2$) is within 5% of a magnitude of the maximum energy value ($E_{max}$).

Figure 6:
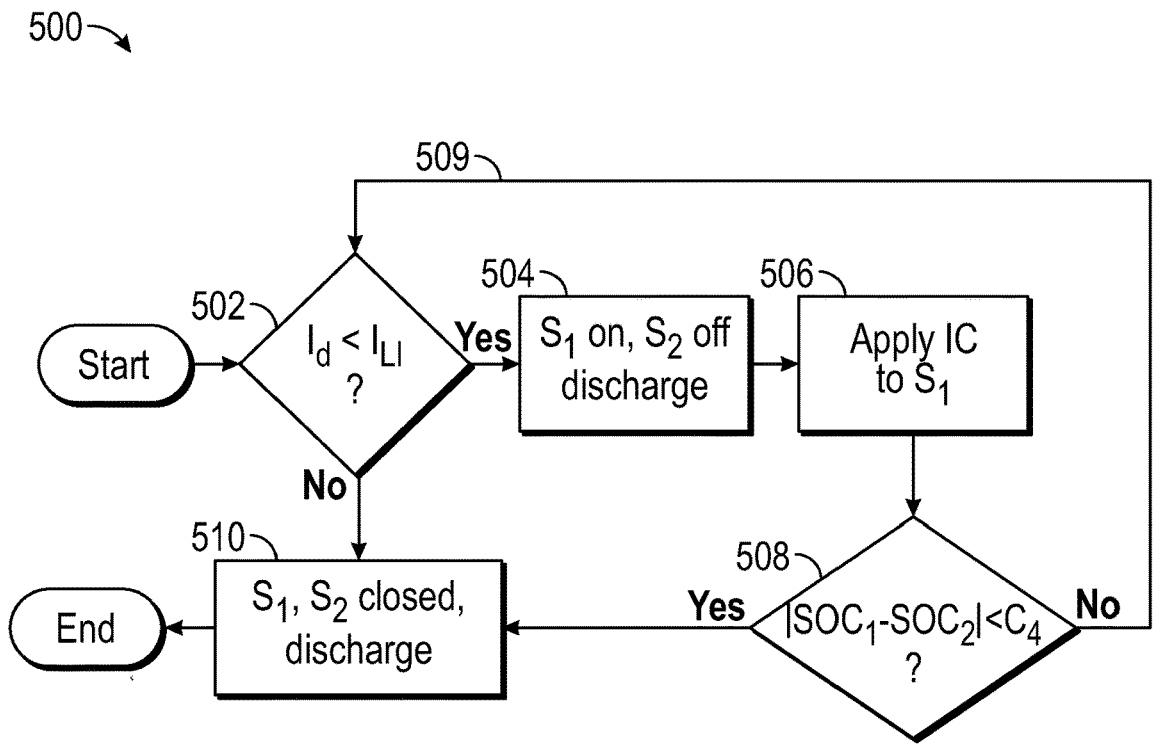
FIG. 6 is a schematic flow diagram of a discharge mode executable by the controller of FIG. 1.

Referring now to FIG. 6, a flowchart of the discharging mode 500 is shown. Per block 502, the controller C is configured to determine if a load demand current ($I_d$) exerted by a load (not shown) on the assembly 11 (for example, by being connected at the first end 30 in FIG. 1) is less than a rated current limit ($I_{L1}$) of the first unit 12 that has the higher SOC value. Each of the respective units U defines a rated current limit ($I_{Li}$) or maximum recommended current flow. If so, per block 504, the controller C is configured to turn the respective switch $S_1$ of the first unit 12 to the ON state, turn the respective switch $S_2$ of the second unit 14 to the OFF state and discharge the first unit 12. Per block 506, the controller C is configured to set a target state of charge as the respective state of charge of the second unit 14 and apply an integration control scheme ("IC" in FIG. 6) to the respective switch $S_1$ of the first unit 12. If not, per block 510, the controller C is configured to keep the respective switch $S_1$ of the first unit 12 and the respective switch $S_2$ of the second unit 14 in the ON state and discharge the first unit 12 and the second unit 14.

Per block 508, the controller C is configured to determine if an absolute value of a difference between the respective state of charge ($SOC_1$) of the first unit 12 and the respective state of charge ($SOC_2$) of the second unit 14 is less than a fourth predefined constant ($C_4$). If so, discharging mode 500 proceeds to block 510, turning the respective switch $S_1$ of the first unit 12 and the respective switch $S_2$ of the second unit 14 in the ON state and discharge the first unit 12 and the second unit 14. If not, the discharging mode 500 loops back to block 502, as indicated by line 509.

In summary, the system 10 (via execution of at least one of the modes 100, 200, 300, 400, 500) robustly creates a balance of the state of charge amongst the respective units U. The system 10 provides a technical advantage of reducing internal power dissipation in the rechargeable energy storage assembly 11 as well as efficiently controlling charging power and discharging power. Accordingly, the system 10 improves the functioning of the rechargeable energy storage assembly 11. The thresholds $T_1$, $T_2$, $T_3$ and predefined constants $C_1$, $C_2$, $C_3$, $C_4$ may be obtained through calibration in a laboratory or test cell and selected based on the application at hand.

The flowcharts in FIGS. 2-6 illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The controller C of FIG. 1 may be an integral portion of, or a separate module operatively connected to, other controllers of the device 16. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system of dynamically balancing a rechargeable energy storage assembly having at least two respective units connected in parallel, a respective switch for each of the respective units and at least one sensor, the system comprising:
   a controller configured to control operation of the respective switch and including a processor and tangible, non-transitory memory on which instructions are recorded;
   wherein the respective switch includes an ON state and an OFF state, the respective switch being configured to enable a respective circuit connection to one of the respective units in the ON state and disable the respective circuit connection in the OFF state;
   wherein the respective units are characterized by a respective state of charge obtained based in part on the at least one sensor;
   wherein the respective units include a first unit and a second unit, the controller being configured to determine a first state of charge (SOC1) for the first unit and a second state of charge (SOC2) for the second unit;
   wherein execution of the instructions by the processor causes the controller to employ at least one of a plurality of charging modes through operation of the respective switch to charge the respective units;
   wherein the plurality of charging modes includes a rest charging mode, a rapid initial charging mode and a rapid final charging mode; and
   wherein in the rest charging mode, the controller is configured to turn the respective switch of the first unit and the respective switch of the second unit to the ON state and charge with a first constant charging current until the first unit and the second unit are fully charged when an absolute value of a difference between the first state of charge (SOC1) and the second state of charge (SOC2) is less than a first predefined constant (C1);
   wherein in the rapid initial charging mode, the controller is configured to:
   set a target state of charge at a third threshold (T3) and turn the respective switch of each of the respective units to the ON state and charge with a second constant charging current; and
   apply an integration control scheme to a specific one of the respective units and selectively charge until fully charged, when an absolute value of a difference between a respective state of charge (SOCi) of a specific one of the respective units and the third threshold (T3) is less than a third predefined constant (C3).

2. The system of claim 1, wherein:
   the rest charging mode is configured to selectively employ a first constant charging current and the rapid initial charging mode is configured to selectively employ the second constant charging current, the second constant charging current being greater than the first constant charging current; and
   the rapid final charging mode is configured to selectively employ a constant voltage.

3. The system of claim 1, wherein:
   in the rest charging mode, the controller is configured to turn the respective switch associated with a higher value of the respective state of charge to the OFF state and selectively charge the respective unit associated with a lower value of the respective state of charge, when the difference between the first state of charge (SOC1) and the second state of charge (SOC2) is more than or equal to the first predefined constant (C1).

4. The system of claim 1, wherein in the rapid final charging mode, the controller is configured to:
   turn the respective switch of each of the respective units to the ON state and charge with a constant voltage when the respective state of charge of at least one of the respective units is less than a second threshold ($T_2$); and
   turn the respective switch associated with the at least one of the respective units to the OFF state and selectively charge remaining ones of the respective units when the respective state of charge of at least one of the respective units is greater than a maximum energy value ($E_{max}$).

5. The system of claim 4, wherein the second threshold ($T_2$) is within 5% of a magnitude of the maximum energy value ($E_{max}$).

6. The system of claim 1, wherein the integration control scheme includes:
   selecting a target state of charge as a maximum of the respective state of charge of the respective units; and
   defining a disparity factor as a difference between a target state of charge and the respective state of charge of the specific one of the respective units; and
   shifting an applied voltage to the specific one of the respective units from a negative value to a positive value when the disparity factor is above a disparity threshold, the disparity threshold being less than zero.

7. The system of claim 1, wherein the third threshold ($T_3$) is between 50% and 70%, inclusive, and the third predefined constant ($C_3$) is between 5% and 7%, inclusive.

8. The system of claim 1, wherein the respective units include a first unit and a second unit, further comprising:
   a discharging mode during which the controller is configured to keep the respective switch of the first unit and the respective switch of the second unit in the ON state and discharge the first unit and the second unit when a load demand current ($I_d$) is more than or equal to a rated current limit ($I_{L1}$) defined by the first unit; and
   in the discharging mode when the load demand current ($I_d$) is less than the rated current limit ($I_{L1}$) of the first unit, the first unit having a higher state of charge relative to the second unit, the controller being configured to:
   turn the respective switch of the first unit to the ON state, turn the respective switch of the second unit to the OFF state and discharge the first unit;
   set a target state of charge as the respective state of charge of the second unit and apply an integration control scheme to the respective switch of the first unit; and
   turn the respective switch of the first unit and the respective switch of the second unit to the ON state and discharge the first unit and the second unit when an absolute value of a difference between the respective state of charge of the first unit and the respective state of charge of the second unit is less than a fourth predefined constant ($C_4$).

9. A method of dynamically balancing a rechargeable energy storage assembly having two or more respective units connected in parallel, a respective switch for each of the respective units, at least one sensor and a controller with a processor and tangible, non-transitory memory, the method comprising:

controlling operation of the respective switch via the controller, including enabling a respective circuit connection to one of the respective units with the respective switch in an ON state and disabling the respective circuit connection with the respective switch in an OFF state, the respective units including a first unit and a second unit;

obtaining a first state of charge (SOC1) for the first unit and a second state of charge (SOC2) for the second unit, based in part on the at least one sensor;

employing at least one of a plurality of charging modes to charge the respective units, via the respective switch and the controller, the plurality of charging modes including a rest charging mode, a rapid initial charging mode and a rapid final charging mode;

in the rest charging mode, turning the respective switch of the first unit and the respective switch of the second unit to the ON state and charging with a first constant charging current until the first unit and the second unit are fully charged when an absolute value of a difference between the first state of charge (SOC1) and the second state of charge (SOC2) is less than a first predefined constant (C1), via the controller;

setting a target state of charge at a third threshold (T3) in the rapid initial charging mode, turning the respective switch of each of the respective units to the ON state and charging with a second constant charging current; and applying an integration control scheme to a specific one of the respective units and selectively charging until fully charged, in the rapid initial charging mode, when an absolute value of a difference between the respective state of charge (SOC1) of a specific one of the respective units and the third threshold (T3) is less than a third predefined constant (C3).

10. The method of claim 9, further comprising:
configuring the rest charging mode to selectively employ a first constant charging current;
configuring the rapid initial charging mode to selectively employ the second constant charging current, the second constant charging current being greater than the first constant charging current; and
configuring the rapid final charging mode to selectively employ a constant voltage.

11. The method of claim 9,
in the rest charging mode, turning the respective switch associated with a higher value of the respective state of charge to the OFF state and selectively charging the respective unit associated with a lower value of the respective state of charge, when the difference between the first state of charge (SOC1) and the second state of charge (SOC2) is more than or equal to the first predefined constant (C1).

12. The method of claim 9, further comprising in the rapid final charging mode:
turning the respective switch of each of the respective units to the ON state and charging with a constant voltage when the respective state of charge of at least one of the respective units is less than a second threshold ($T_2$), via the controller; and
turning the respective switch associated with the at least one of the respective units to the OFF state and selectively charging remaining ones of the respective units when the respective state of charge of at least one of the respective units is greater than a maximum energy value ($E_{max}$), via the controller.

13. The method of claim 11, further comprising in the rapid initial charging mode:
setting the second constant charging current to be greater than the first constant charging current.

14. The method of claim 13, wherein the integration control scheme includes:
selecting a target state of charge as a maximum of the respective state of charge of the respective units; and
defining a disparity factor as a difference between the target state of charge and the respective state of charge of the specific one of the respective units; and
shifting an applied voltage to the specific one of the respective units from a negative value to a positive value when the disparity factor is above a disparity threshold, the disparity threshold being less than zero.

15. The method of claim 14, wherein the third threshold ($T_3$) is between 50% and 70%, inclusive, and the third predefined constant ($C_3$) is between 5% and 7%, inclusive.

16. The method of claim 9, further comprising:
in a discharging mode, turning the respective switch of the first unit and the respective switch of the second unit to the ON state and discharging the first unit and the second unit when a load demand current ($I_d$) is more than or equal to a rated current limit ($I_{L1}$) defined by the first unit;
in the discharging mode, when the load demand current ($I_d$) is less than the rated current limit ($I_{L1}$) of the first unit, the first unit having a higher state of charge relative to the second unit:
turning the respective switch of the first unit to the ON state, turn the respective switch of the second unit to the OFF state and discharging the first unit;
setting the target state of charge as the respective state of charge of the second unit and applying an integration control scheme to the respective switch of the first unit; and
turning the respective switch of the first unit and the respective switch of the second unit to the ON state and discharging the first unit and the second unit when an absolute value of a difference between the respective state of charge of the first unit and the respective state of charge of the second unit is less than a fourth predefined constant ($C_4$).

17. A system of dynamically balancing a rechargeable energy storage assembly having at least two respective units connected in parallel, a respective switch for each of the respective units and at least one sensor, the system comprising:
a controller configured to control operation of the respective switch and including a processor and tangible, non-transitory memory on which instructions are recorded;
wherein the respective switch includes an ON state and an OFF state, the respective switch being configured to enable a respective circuit connection to one of the respective units in the ON state and disable the respective circuit connection in the OFF state;
wherein the respective units are characterized by a respective state of charge obtained based in part on the at least one sensor;
wherein the respective units include a first unit and a second unit, the controller being configured to determine a first state of charge ($SOC_1$) for the first unit and a second state of charge ($SOC_2$) for the second unit;
wherein execution of the instructions by the processor causes the controller to employ at least one of a plurality of charging modes through operation of the respective switch to charge the respective units, the plurality of charging modes including a rest charging mode, a rapid initial charging mode and a rapid final charging mode;

wherein in the rest charging mode, the controller is configured to turn the respective switch of the first unit and the respective switch of the second unit to the ON state and charge with a first constant charging current until the first unit and the second unit are fully charged when an absolute value of a difference between the first state of charge (SOC1) and the second state of charge (SOC2) is less than a first predefined constant (C1);

wherein in the rapid initial charging mode where there are exactly two of the respective units, the controller is configured to:

turn the respective switch of the first unit and the respective switch of the second unit to the ON state and charge both with a second constant charging current, when the first state of charge (SOC1) for the first unit and the second state of charge (SOC2) for the second unit are both less than a first threshold (T1), the second constant charging current being greater than the first constant charging current; and set a target state of charge and selectively charge the respective unit associated with a lower value of the state of charge until charged to the target state of charge, when an absolute value of a difference between the first state of charge (SOC1) and the second state of charge (SOC2) is greater than a second predefined constant (C2).

18. The system of claim 17, wherein the first threshold ($T_1$) is 50%.

* * * * *